June 7, 1949. E. H. WHITE 2,472,638
THERMOSTATIC CONTROL DEVICE
Filed March 29, 1946 2 Sheets-Sheet 1
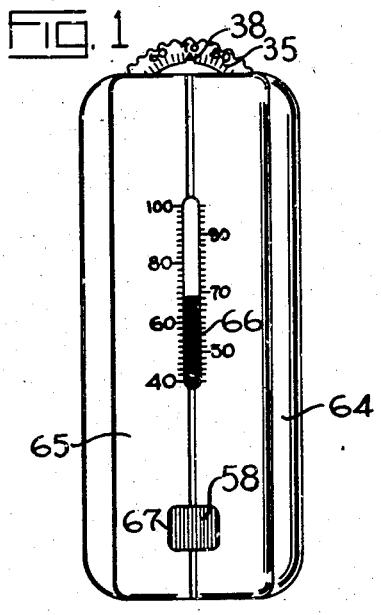
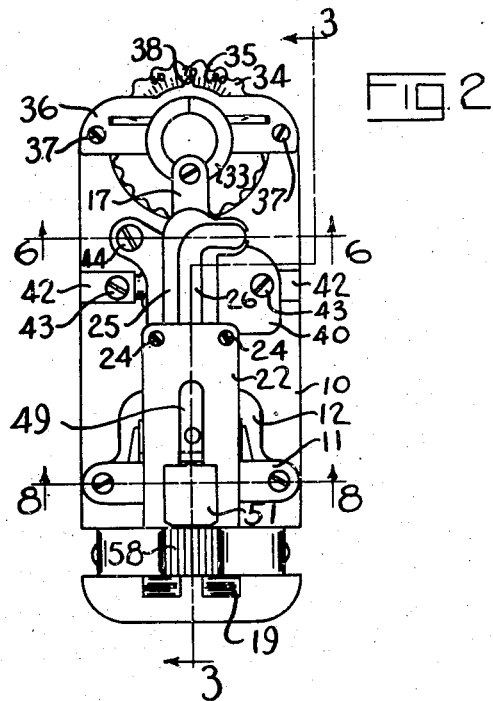
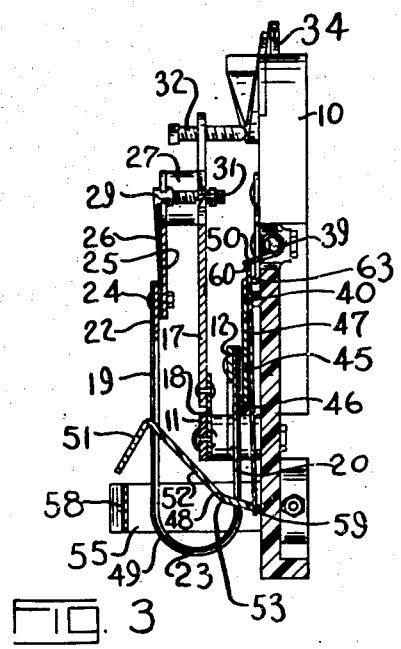
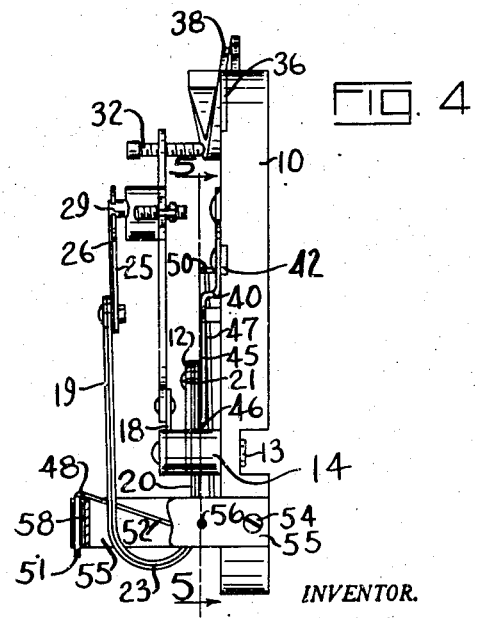
INVENTOR.
EVERETT H. WHITE
BY
G. H. Braddock
ATTORNEY June 7, 1949.  E. H. WHITE  2,472,638
THERMOSTATIC CONTROL DEVICE
Filed March 29, 1946  2 Sheets-Sheet 2
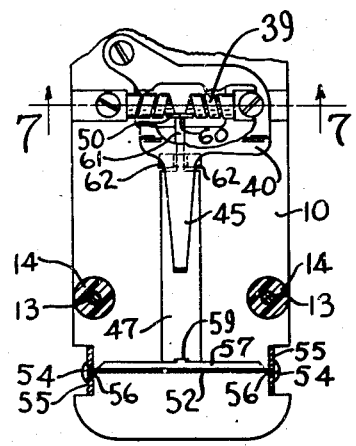
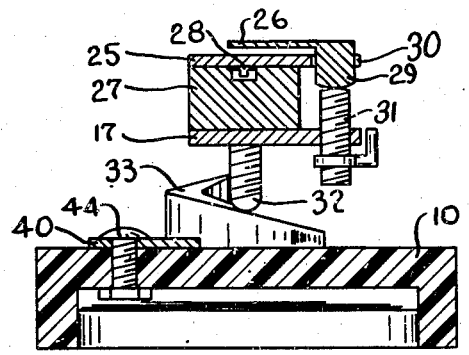
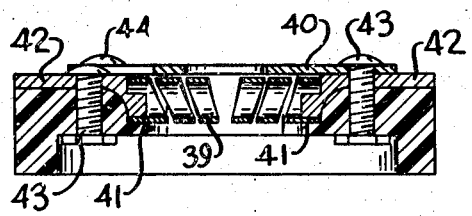
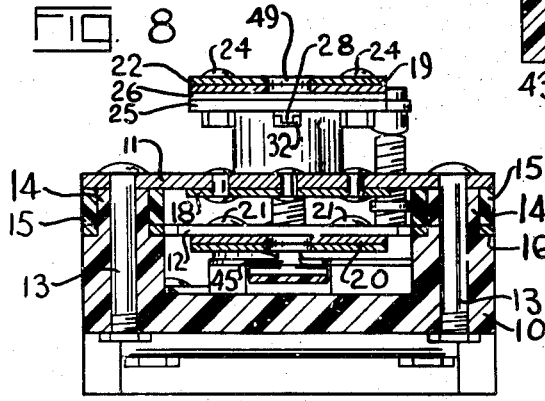
INVENTOR.
EVERETT H. WHITE
BY
G. H. Braddock
ATTORNEY Patented June 7, 1949

2,472,638

UNITED STATES PATENT OFFICE 2,472,638

THERMOSTATIC CONTROL DEVICE

Everett H. White, St. Paul, Minn.

Application March 29, 1946, Serial No. 658,025

6 Claims. (Cl. 177—311)

The present invention has relation to a thermostatic control device useful for a variety of purposes but designed to be more especially useful to the purpose of assisting or cooperating in the regulation and control of ordinary or preferred types of heating systems.

An object of the invention is to provide a thermostatic control device which will be of novel and improved construction.

A further object is to provide a thermostatic control device wherein will be incorporated various desirable and improved features and characteristics of construction novel both as individual entities of the thermostatic control device and in combination with each other.

A further object is to provide a thermostatic control device which will include novel and improved features and characteristics of construction adapted to render the thermostatic control device capable of functioning as means for operating an indicator.

A further object is to provide a thermostatic control device which will include novel and improved features and characteristics of construction adapted to render the thermostatic control device capable of functioning as a thermostat of the so-called anticipating type.

A further object is to provide a thermostatic control device which will include features and characteristics of construction adapted to render the thermostatic control device capable of functioning at one and the same time as a thermostat of the so-called anticipating, accelerating or heat leveling type and as means for operating an indicator.

And a further object is to provide a thermostatic control device of construction as hereinafter set forth.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 1 is a front elevational view of a thermostatic control device made according to the invention;

Fig. 2 is a front elevational view of the thermostatic control device of Fig. 1 with the cover member removed;

Fig. 3 is a longitudinal sectional view, taken substantially on line 3—3 in Fig. 2;

Fig. 4 is a side elevational view, partially in section and partially broken away, as seen from the right in Fig. 2, disclosing parts of the thermostatic control device in different positions;

Fig. 5 is a detail sectional view, taken substantially on line 5—5 in Fig. 4;

Fig. 6 is an enlarged transverse sectional view, taken substantially on line 6—6 in Fig. 2;

Fig. 7 is an enlarged transverse sectional view, taken substantially on line 7—7 in Fig. 5; and Fig. 8 is an enlarged transverse sectional view, taken substantially on line 8—8 in Fig. 2, but omitting an indicating element of the thermostatic control device.

With respect to the drawings and the numerals of reference thereon, an insulating base, denoted 10, for the thermostatic control device is constituted as a generally flat piece of rectilinear configuration.

Spaced apart, parallel, upper and lower supporting strips, designated 11 and 12, respectively, are fixedly supported upon the insulating base 10. The upper supporting strip 11 is of conducting material. As disclosed, said supporting strips 11 and 12 are of generally flat configuration; the conducting and supporting strip 11 is retained in contiguous relation to forward surfaces of uprights or posts 14, 14 of the insulating base 10 by headed and nutted metallic bolts 13, 13, opposite end portions of the strip 12 are fitted upon reduced portions of the uprights or posts 14, 14, and annular spacers 15, 15 of insulating material, upon the reduced portions of said posts or uprights and between said supporting strips 11 and 12, retain the supporting strip 12 against annular shoulders 16, 16 of the insulating base 10 in surrounding relation to the inner ends of the reduced portions of uprights or posts 14, 14.

A conducting and adjusting element or arm 17 of the thermostatic control device, of elongated, generally flat configuration, is supported upon the conducting and supporting strip 11 in aligned relation thereto through the instrumentality of a resilient conducting and supporting strip 18 rigidly connected between said conducting and supporting strip 11 and the conducting and adjusting element or arm 17. The construction and arrangement are such that said conducting and adjusting element or arm 17 is situated at elevation above the conducting and supporting strip 11 and extends longitudinally of the insulating base 10 in substantially parallel relation thereto, and that the supporting strip 12 is situated between and in spaced relation to a lower portion of said insulating base 10 and a lower portion of the conducting and adjusting element or arm 17. Said conducting and adjusting element or arm is supported upon the conducting and supporting strip 11 by the resilient conducting and supporting strip 18 so as to be swingable in direction toward and away from the insulating base 10.

A bi-metallic blade or thermostatically responsive member of the control device is denoted 19. As disclosed, said blade or member 19 is of U-shape. It includes a shorter leg 20 which is fixed, as at 21, to the supporting strip 12, a longer leg 22 which is in spaced relation to and disposed forwardly of the conducting and supporting strip 11, the conducting and adjusting element or arm 17 and the resilient conducting and supporting strip 18, and a base 23 between said legs 20 and 22 and beneath and in spaced relation to said strips 11 and 12. The longer leg 22 of the bi-metallic blade or thermostatically responsive member 19 is disposed in substantially parallel relation to said conducting and supporting strip 11, conducting and adjusting element or arm 17 and blade or member 19, and the strips 11 and 12 are situated in a plane passed perpendicularly and longitudinally through the insulating base 10. The end portion of the longer leg 22 spaced from the base 23 of said blade or member 19 fixedly supports, as at 24, an armature 25 and a flexible conducting entity 26 which are in superimposed relation to each other and in alined relation with said longer leg 22.

The armature 25 is adapted to be engaged with and disengaged from a magnet 27 of the thermostatic control device fixed upon an adjacent surface of the conducting and adjusting element or arm 17 in spaced relation to the resilient conducting and supporting strip 18. The magnet 27 as illustrated is of annular or disc configuration, and desirably may be an aluminum-nickel alloy, or other suitable material. As shown, said magnet 27 includes a flat inner or rear surface thereof which is seated against the forward or outer surface of the conducting and adjusting element or arm 17, and the magnet and said element or arm 17 can be secured to each other in any suitable and convenient manner. Said magnet 27 includes a flat outer or front surface having a groove or slot 28 therein extending the full distance across said outer or front surface of the magnet.

The flexible conducting entity 26 is at the forward side of the armature 25, or side of said armature opposite the magnet 27, and integrally or rigidly supports a contact button 29 which is freely movable in a slot 30 in said armature 25 and is adapted to be engaged with and separated from a terminal screw 31 disposed perpendicularly to and threadably adjustable in the conducting and adjusting element or arm 17. The terminal screw 31 is adapted to be adjusted in direction toward and away from the contact button 29. The construction and arrangement will be such that when the contact button 29 and the terminal screw 31 are engaged, the conducting entity 26 will be flexed forwardly.

The control device of the invention is for the purpose of assisting or cooperating in the regulation of an instrumentality or device which requires motive power to effect its operation. In response to flexing of the bi-metallic blade or thermostatically responsive member 19 the contact button 29 sometimes will engage the terminal screw 31 and sometimes will be disengaged from said terminal screw, thus to control a circuit including said contact button and the terminal screw. That is, the bi-metallic blade or thermostatically responsive member 19 is adapted to be actuated in repsonse to temperature changes to make and break a circuit including the contact button 29 and said terminal screw 31.

The conducting and adjusting element or arm 17 is adjustable so that a circuit including said contact button 29 and the terminal screw 31 can be made and broken when the bi-metallic blade or thermostatically responsive member 19 is subject to any temperature, within limits, which may be selected. More explicitly, the upper end portion of the conducting and adjusting element or arm 17 adjustably supports a spacer screw 32 which is in perpendicular relation to said conducting and adjusting element or arm, and an end of said spacer screw is retained in engaged relation with an insulating cam surface 33 by reason of resiliency of the conducting and supporting strip 18. The cam surface 33 is rigid with a dial 34 which is suitably and conveniently rotatably mounted in the insulating base 10. A forward surface of the dial 34 is calibrated, as at 35, in degrees of temperature. Evidently, by rotation of the dial, the element or arm 17 can be swung in direction toward and away from the longer arm 22 of the bi-metallic blade or thermostatically responsive member 19 so that the terminal screw 31 will be closer to or farther from the contact button 29.

A guard plate 36 is disposed centrally across the dial 34, and the opposite end portions of said guard plate are secured, as by screws 37, to the insulating base. The guard plate 36 is in proximate or contiguous relation to the outer or forward surface of the dial 34, and includes a pointer 38 for reference to the calibrations 35 upon said dial.

A bi-metallic strip 39, wound to the form, roughly, of a helix and adapted to be energized thus to be heated, is fastened down within the insulating base 10, and a heat absorbing piece 40 is fastened down upon said insulating base 10 over the bi-metallic strip or helix 39 to be capable of absorbing heat from said bi-metallic strip or helix when the bi-metallic strip or helix is energized. More explicitly, opposite end portions of the bi-metallic strip or helix 39 are fixedly secured, as at 41, 41, upon reduced portions of conducting members 42, 42, and said conducting members are secured to the insulating base 10 by metallic screws 43, 43. The heat absorbing piece 40 is secured down against one of the conducting members 42, 42 and down against said insulating base 10 by one of the metallic screws 43 as well as by an additional metallic screw 44. An extension portion 45 of the heat absorbing piece 40 is engaged, as at 46, with a portion of the shorter leg 20 of the bi-metallic blade or thermostatically responsive member 19, and the construction and arrangement are such that said bi-metallic strip or helix 39 and said heat absorbing piece 40 are conductively connected to each other and to said bi-metallic blade or thermostatically responsive member 19 to be included in a circuit with the contact button 29 and the terminal screw 31 when these are engaged. A circuit including the parts mentioned is traceable from one of the bolts 13 to the conducting and supporting strip 11, thence through the resilient conducting and supporting strip 18 and the conducting and adjusting element 17 to the terminal screw 31, thence through the contact button 29 and the flexible conducting entity 26 to the bi-metallic blade or thermostatically responsive member 19, and thence through the heat absorbing piece 40, one of the conducting members 42 (the one at the right in Fig. 7) and the bi-metallic strip or helix 39 to the other of said conducting members 42 and one of the metallic screws 43 (at the left in said Fig. 7).

An elongated actuator 47 of the thermostatic control device, of insulating material as disclosed, is adapted to be moved or slid longitudinally relative to the insulating base 10 thus to cause an indicating element 48 of said thermostatic control device, situated in a longitudinal slot 49 of the bi-metallic blade or thermostatically actuated member 19, to be operated. The elongated actuator 47 is constituted in the disclosure as made as a flat rectilinear bar.

An upstanding or outstanding part 50 of the bi-metallic strip or helix 39, at the midlength of said bi-metallic strip or helix as shown, is for causing the elongated actuator 47 to be moved or slid longitudinally.

The indicating element 48 is of general L-shape. It includes a shorter arm 51 situated forwardly of said indicating element and a longer arm 52 extending rearwardly from said shorter arm at angular relation thereto. The shorter arm 51 extends downwardly from the forward end of the longer arm 52, and a rearward portion of said longer arm is bent upwardly slightly, as at 53, relative to the remainder of the longer arm.

The insulating base 10 rigidly supports, as at 54, 54, spaced apart, parallel, forwardly extending strips 55, 55, and the rearward portion of the longer arm 52 of the indicating element 48 is pivotally supported, as at 56, 56, upon and between said strips 55, 55. A relatively long portion of the longer arm 52 is situated forwardly of the pivotal supports 56, 56 and a comparatively shorter portion 57 of said longer arm is situated rearwardly of said pivotal supports. The comparatively short portion 57 of the longer arm 52 is adapted to be engaged by the adjacent end of the longitudinally movable or slidable elongated actuator 47, and the shorter arm 51 is adapted selectively to be situated over a colored surface (say red) 58 between and supported by the strips 55, 55 and to be clear of said colored surface.

The lower end of the elongated actuator 47 is pivotally secured, as at 59, to the comparatively short portion 57 of the longer arm 52 of the indicator or indicating element 48, and the upper end 60 of an upper portion 61 of reduced width of said elongated actuator is in engaged relation with the upstanding or outstanding part 50 of said bi-metallic strip or helix 39. Said upper end portion 61 of reduced width of the elongated actuator 47 lies between spaced apart protuberances 62, 62 upon the insulating base 10 and beneath the heat absorbing piece 40, and said heat absorbing piece is cut away, as indicated at 63, at location adjacent the upstanding or outstanding part 50, to permit passage of the upper end portion 61. The spaced apart protuberances 62, 62 and the heat absorbing piece 40 and its cut-away part 63 together constitute a guide for the upper portion of the elongated actuator 47. As will be clear, said elongated actuator is adapted to be moved or slid in direction longitudinally of the insulating base 10.

A removable cover member for the insulating base and operative parts of the control device is represented at 64. Said cover member is constituted as a rectilinear shell including an outer or forward wall 65, opposite side walls, a top wall and a bottom wall. The inner or rearward side of the cover member 64 will be open. The outer or forward wall 65 of said cover member suitably and conveniently supports a thermostatic bulb 66 having mercury therein, and said outer or forward wall includes an opening 67 through which the colored surface 58 will be visible when the indicating element 48 is situated as in Figs. 1, 2 and 3 of the drawings and will be invisible when said indicating element is situated as in Fig. 4.

The opposite side walls of the cover member 64 are closed. The top wall of said cover member includes an elongated opening for the reception of an upwardly projecting portion of the dial 34. Also, the top and bottom walls of the cover member will include openings for permitting free passage of air into the interior of said cover member, between the cover member and the insulating base 10.

In any installation of a thermostatic control device made according to the invention, the make and break at the terminals 29—31 will be by snap action caused by magnetic attraction between the magnet 27 and the armature 25.

The new and improved thermostatic control device is adapted to be installed in a room or space to be heated, and the contact button 29 and the terminal screw 31 are adapted to become engaged when the room or space calls for heat thus to cause a motor for controlling a furnace for heating said room or space, the bi-metallic strip or helix 39, the heat absorbing piece 40 and the bi-metallic blade or thermostatically actuated member 19 to be included in a closed electrical circuit. Energization of the bi-metallic strip or helix 39 is adapted to cause said strip or helix to become heated so that its upstanding or outstanding part 50 will swing in downward direction, toward the indicating element 48, thus to cause the elongated actuator 47 to be forcibly moved or slid downwardly. Said elongated actuator 47 when forcibly moved or slid downwardly will cause the shorter portion 57 of the longer arm 52 of said indicating element 48 to be swung downwardly thus to cause the longer portion of said longer arm and the shorter arm 51 of the indicating element to be swung upwardly against gravity. Upward swinging movement of said shorter arm 51 will cause the colored surface 58 to be uncovered as in Figs. 1, 2 and 3 of the drawings. Uncovering action of said colored surface 58 occurs quickly in practice, immediately after the circuit including the bi-metallic strip or helix 39 is closed. The contact button 29 and the terminal screw 31 are adapted to become separated when the room or space temperature becomes satisfied thus to cause the bi-metallic strip or helix 39 to be deenergized. Deenergization of said bi-metallic strip or helix will permit the strip or helix to cool off so that the upstanding or outstanding part 50 will move upwardly in direction away from the indicating element 48 thus to permit the shorter arm 51 to be moved by gravity to cover the colored surface 58, as said shorter arm is disclosed in Fig. 4. In practical operation of the control device, if you see the colored surface 58 when you look through the opening 67 in the cover member 64, the furnace motor is energized and the furnace is "on." If, on the other hand, you see the shorter arm 51 in covering relation to said colored surface 58, said furnace motor is deenergized and the furnace is "off."

The bi-metallic strip or helix 39 and the heat absorbing piece 40, included as a part of the control device and constructed and arranged relative to each other and relative to the bi-metallic blade or thermostatically actuated member 19 in the manner as set forth, constitute what is commonly called an anticipator for said blade or member. That is to say, immediately when the circuit including the bi-metallic strip or helix 39, the heat absorbing piece 40, the bi-metallic blade or thermostatically actuated member 19, etc., becomes closed, the strip or helix 39 commences to impart heat to the heat absorbing piece 40, and said heat absorbing piece is adapted to transmit the heat to the blade or member 19. Stated otherwise, the control device is of the heat levelling or accelerating type.

The amount of heat imparted to the blade or member 19 obviously will be a function of the relation of the heat absorbing piece 40 to the strip or helix 39 and to said blade or member 19. In the illustrated embodiment of the invention, said heat absorbing piece 40 is in partially surrounding relation to said strip or helix 39, and the extension portion 45 of the heat absorbing piece is tapered and includes a free end of reduced dimension engaged against the blade or element 19. The amount of heat imparted to said blade or element 19 can be nicely regulated and controlled by control of the size of the free end or end portion of said extension portion 45 engaged with the blade or element 19. With increase of the area of engagement between the extension portion 45 and the bi-metallic blade or thermostatically responsive member 19, the heat imparted to said blade or member will be increased, and vice versa.

The bi-metallic strip or helix 39 evidently is adapted to function at one and the same time to move or slide the elongated actuator to cause the indicating element 48 to be actuated and to impart heat to the heat absorbing piece 40.

Said bi-metallic strip or helix 39 in the disclosure as made is constituted as a pair of alined coils the opposite ends of which are secured, at 41, 41, to the conducting members 42, 42 and the adjacent ends of which are integrally connected and merge into and/or provide the upstanding or outstanding part 50 engaged against the elongated actuator 47.

What is claimed is:

1. In a thermostatic control device, an insulating base, a bimetallic strip of helical configuration supported on said insulating base, an indicating element, an actuator between said bimetallic strip and indicating element for causing the indicating element to be situated in one position when said bimetallic strip is energized and in a different position when the bimetallic strip is deenergized, a heat absorbing piece of conducting material contiguous with said bimetallic strip, a bimetallic blade supported upon said insulating base in heat exchange relation to said heat absorbing piece, said bimetallic strip, heat absorbing piece and bimetallic blade being conductively connected to each other, and a conducting element for selective engagement with said bi-metallic blade.

2. In a thermostatic control device, an insulating base, a bimetallic strip supported on said insulating base, an indicating element, an actuator between said bimetallic strip and indicating element for causing the indicating element to be situated in one position when said bimetallic strip is energized and in another position when the bimetallic strip is deenergized, a bimetallic blade supported on the insulating base in spaced relation to said bimetallic strip, a conducting element for selective engagement with said bi-metallic blade, and a heat absorbing piece of conducting material conductively connected between and in heat transferring relation with said bi-metallic strip and bimetallic blade.

3. In a thermostatic control device, an insulating base, a bimetallic strip supported on said insulating base, an indicating element, an actuator between said bimetallic strip and indicating element for causing the indicating element to be situated in one position when said bimetallic strip is energized and in a different position when the bimetallic strip is deenergized, a heat absorbing piece of conducting material situated in relation to said bimetallic strip to be capable of absorbing heat therefrom, a bimetallic blade supported on said insulating base in heat exchange relation to said heat absorbing piece, the heat absorbing piece being conductively connected to both said bimetallic strip and said bimetallic blade, and a conducting element for selective engagement with said bi-metallic blade.

4. In a thermostatic control device, an insulating base, a bimetallic strip supported on said insulating base, an indicating element, an actuator between said bimetallic strip and indicating element for causing the indicating element to be situated in one position when said bimetallic strip is energized and in a different position when the bimetallic strip is deenergized, a bimetallic blade supported on the insulating base in spaced relation to said bimetallic strip, a conducting element supported on said insulating base, means operative in response to temperature changes of said bimetallic blade for selectively connecting and disconnecting said conducting element and bimetallic blade, and a heat absorbing piece of conducting material in relation to said bimetallic strip to absorb heat therefrom and in relation to said bi-metallic blade to impart heat thereto, said heat absorbing piece being conductively connected to said bimetallic strip and said bimetallic blade.

5. In a thermostatic control device, an insulating base, a bimetallic strip and a bimetallic blade on said insulating base, a conducting element for selective engagement with said bimetallic blade, an indicating device, an actuator between said bimetallic strip and said indicating device adapted to cause the indicating device to be actuated when the bimetallic strip is energized, and a heat absorbing piece of conducting material in relation to said bimetallic strip to absorb heat therefrom and in relation to said bimetallic blade to impart heat thereto, said heat absorbing piece being conductively connected to said bi-metallic strip and said bimetallic blade.

6. In a thermostatic control device, an insulating base, a bimetallic strip and a bimetallic blade on said insulating base, a surface supported by the insulating base, an indicating device for causing said surface selectively to be covered and uncovered, means pivotally supporting said indicating device on said insulating base, an actuator between said bimetallic strip and indicating device adapted to cause the indicating device to be actuated to uncover said surface when the bimetallic strip is energized and to cover said surface when said bimetallic strip is deenergized, a conducting element supported on said insulating base, means operative in response to temperature changes of said bimetallic blade for selectively connecting and disconnecting said conducting element and bimetallic blade, and a heat absorbing piece of conducting material in relation to said bimetallic strip to absorb heat therefrom and in relation to said bimetallic blade to impart heat thereto, said heat absorbing piece being conductively connected to said bimetallic strip and said bimetallic blade.

EVERETT H. WHITE.

REFERENCES CITED

The following references are of record in the file of this patent:

UNITED STATES PATENTS

| Number | Name | Date |
| --- | --- | --- |
| 528,189 | Thompson | Oct. 30, 1894 |
| 847,543 | Batault | Mar. 19, 1907 |
| 1,574,508 | O'Keeffe | Feb. 23, 1926 |
| 1,767,709 | Smith | June 24, 1930 |
| 1,854,786 | Dicke | Apr. 19, 1932 |
| 2,130,829 | Ackermann | Sept. 20, 1938 |
| 2,179,792 | Lappin | Nov. 14, 1939 |
| 2,197,230 | Waddell | Apr. 16, 1940 |
| 2,269,863 | Shaw | Jan. 13, 1942 |

FOREIGN PATENTS

| Number | Country | Date |
| --- | --- | --- |
| 646,009 | Germany | June 7, 1937 |